United States Patent
Ianni et al.

(10) Patent No.: US 12,475,564 B2
(45) Date of Patent: Nov. 18, 2025

(54) DIGITAL PATHOLOGY ARTIFICIAL INTELLIGENCE QUALITY CHECK

(71) Applicant: Proscia Inc., Philadelphia, PA (US)

(72) Inventors: Julianna Ianni, Merchantville, NJ (US); Vaughn Spurrier, Philadelphia, PA (US); Sean Grullon, Philadelphia, PA (US)

(73) Assignee: PROSCIA INC., Philadelphia, PA (US)

( * ) Notice: Subject to any disclaimer, the term of this patent is extended or adjusted under 35 U.S.C. 154(b) by 425 days.

(21) Appl. No.: 18/065,715

(22) Filed: Dec. 14, 2022

(65) Prior Publication Data

US 2023/0260125 A1    Aug. 17, 2023

Related U.S. Application Data

(60) Provisional application No. 63/310,741, filed on Feb. 16, 2022.

(51) Int. Cl.
*G06K 9/00* (2022.01)
*G06T 7/00* (2017.01)

(52) U.S. Cl.
CPC .. *G06T 7/0016* (2013.01); *G06T 2207/20081* (2013.01); *G06T 2207/20084* (2013.01); *G06T 2207/30024* (2013.01)

(58) Field of Classification Search
CPC ......... G06T 7/0002; G06T 2207/20081; G06T 2207/20084; G06T 9/002; G06T 5/60;
(Continued)

(56) References Cited

U.S. PATENT DOCUMENTS

| 5,647,025 A | 7/1997 | Frost et al. |
| 5,671,288 A | 9/1997 | Wilhelm et al. |

(Continued)

FOREIGN PATENT DOCUMENTS

CA    2604317 C    2/2017

OTHER PUBLICATIONS

Lindner, Nora (PCT Authorized Officer), Notification Concerning Transmittal of International Preliminary Report on Patentability (Chapter I of the Patent Cooperation Treaty) mailed Aug. 29, 2024 in corresponding PCT Application No. PCT/US2023/013126, 8 pages.

(Continued)

*Primary Examiner* — Atiba O Fitzpatrick
(74) *Attorney, Agent, or Firm* — MH2 Technology Law Group LLP

(57) ABSTRACT

Techniques of automated quality control for digital pathology whole slide images are presented. The techniques include obtaining a thumbnail image derived from a whole slide image of a pathology slide; determining whether the whole slide image includes an artifact in a first class of artifacts by providing the thumbnail image to an electronic neural network trained to detect artifacts in the first class of artifacts by analyzing a plurality of labeled training thumbnail images; generating a tissue mask representing tissue depicted in the thumbnail image; determining whether the whole slide image includes an artifact in a second class of artifacts by performing a comparison using the tissue mask; and providing an indication of whether the whole slide image includes an artifact in the first class of artifacts or an artifact in the second class of artifacts.

24 Claims, 7 Drawing Sheets

(58) Field of Classification Search
CPC . G06T 2207/10056; G06T 2207/10061; G06T 2207/30024; A61B 6/5258–5282; A61B 5/7203; G06K 9/6256; G06K 9/6257; G06K 9/6259; G06V 10/70; G06V 10/82; G06V 10/774–7796; G06V 10/454; G06V 20/69–698; G06V 2201/04; G06N 3/02–126; G06N 20/00–20; G06F 18/214–2155; G06F 7/023; G06F 40/16; G01N 29/4481

See application file for complete search history.

(56) References Cited

U.S. PATENT DOCUMENTS

| | | |
|---|---|---|
| 6,718,053 B1 | 4/2004 | Ellis et al. |
| 6,745,067 B1 | 6/2004 | Zavislan et al. |
| 7,050,610 B2 | 5/2006 | Chen et al. |
| 7,212,949 B2 | 5/2007 | Bachrach |
| 7,236,619 B2 | 6/2007 | Doi et al. |
| 7,456,377 B2 | 11/2008 | Zeineh et al. |
| 7,461,048 B2 | 12/2008 | Teverovskiy et al. |
| 7,520,857 B2 | 4/2009 | Chalana et al. |
| 7,545,965 B2 | 6/2009 | Suzuki et al. |
| 7,769,219 B2 | 8/2010 | Zahniser |
| 7,941,275 B2 | 5/2011 | Gholap et al. |
| 8,160,348 B2 | 4/2012 | Pinard et al. |
| 8,165,363 B2 | 4/2012 | Soenksen et al. |
| 8,199,989 B2 | 6/2012 | Dekel |
| 8,265,362 B2 | 9/2012 | Sano et al. |
| 8,280,132 B2 | 10/2012 | Madabhushi et al. |
| 8,346,483 B2 | 1/2013 | Kil |
| 8,369,600 B2 | 2/2013 | Can et al. |
| 8,396,269 B2 | 3/2013 | Henderson et al. |
| 8,417,015 B2 | 4/2013 | Pinard et al. |
| 8,488,863 B2 | 7/2013 | Boucheron |
| 8,565,503 B2 | 10/2013 | Eichhorn et al. |
| 8,571,353 B2 | 10/2013 | Watanabe |
| 8,600,143 B1 | 12/2013 | Kulkarni et al. |
| 8,687,860 B2 | 4/2014 | Gustafson |
| 8,744,163 B2 | 6/2014 | Morris |
| 8,787,651 B2 | 7/2014 | Potts et al. |
| 8,831,311 B2 | 9/2014 | Swamy et al. |
| 8,831,327 B2 | 9/2014 | Santamaria-Pang et al. |
| 8,840,555 B2 | 9/2014 | Miller et al. |
| 8,891,842 B2 | 11/2014 | Peligrad |
| 8,995,733 B2 | 3/2015 | Van Dijk et al. |
| 8,996,570 B2 | 3/2015 | Stratman et al. |
| 9,060,685 B2 | 6/2015 | Cosatto et al. |
| 9,092,851 B2 | 7/2015 | Marugame |
| 9,098,736 B2 | 8/2015 | Soenksen et al. |
| 9,224,106 B2 | 12/2015 | Cosatto et al. |
| 9,235,875 B2 | 1/2016 | Ioffe et al. |
| 9,298,968 B1 | 3/2016 | Peljto et al. |
| 9,392,986 B2 | 7/2016 | Ning et al. |
| 9,424,459 B1 | 8/2016 | Lange et al. |
| 9,547,898 B2 | 1/2017 | Häll et al. |
| 9,554,766 B2 | 1/2017 | Kyriakou |
| 9,589,210 B1 | 3/2017 | Estrada et al. |
| 9,589,374 B1 | 3/2017 | Gao et al. |
| 9,619,883 B2 | 4/2017 | Yudovsky |
| 9,655,563 B2 | 5/2017 | Liu et al. |
| 9,672,614 B2 | 6/2017 | Dwivedi |
| 9,710,694 B2 | 7/2017 | Soenksen et al. |
| 9,721,340 B2 | 8/2017 | Gillies et al. |
| 9,767,555 B2 | 9/2017 | Madabhushi et al. |
| 9,786,047 B2 | 10/2017 | Doi |
| 9,798,918 B2 | 10/2017 | Remiszewski et al. |
| 9,836,664 B1 | 12/2017 | Ramaswamy et al. |
| 9,836,839 B2 | 12/2017 | Champlin et al. |
| 9,858,665 B2 | 1/2018 | Metzger et al. |
| 9,916,515 B2 | 3/2018 | Vink et al. |
| 9,946,953 B2 | 4/2018 | Tunstall et al. |
| 9,980,704 B2 | 5/2018 | Gratacós Solsona et al. |
| 10,013,743 B2 | 7/2018 | Kuo et al. |
| 10,025,902 B2 | 7/2018 | Barral |
| 10,043,088 B2 | 8/2018 | Odry et al. |
| 10,049,447 B2 | 8/2018 | Lloyd et al. |
| 10,049,770 B2 | 8/2018 | Madabhushi et al. |
| 10,055,551 B2 | 8/2018 | Agaian et al. |
| 10,074,037 B2 | 9/2018 | Lu et al. |
| 10,074,038 B2 | 9/2018 | Hsieh et al. |
| 10,102,418 B2 | 10/2018 | Bredno et al. |
| 10,127,659 B2 | 11/2018 | Hsieh et al. |
| 10,176,579 B2 | 1/2019 | Chukka et al. |
| 10,209,165 B2 | 2/2019 | Grunkin et al. |
| 10,241,115 B2 | 3/2019 | Pierce et al. |
| 10,255,693 B2 | 4/2019 | Smith |
| 10,255,997 B2 | 4/2019 | Calhoun et al. |
| 10,262,101 B2 | 4/2019 | Grady et al. |
| 10,282,588 B2 | 5/2019 | Comaniciu et al. |
| 10,290,084 B1 | 5/2019 | Podilchuk et al. |
| 10,339,678 B2 | 7/2019 | Katsevich et al. |
| 10,360,477 B2 | 7/2019 | Bhaskar et al. |
| 10,360,664 B2 | 7/2019 | Lee et al. |
| 10,387,765 B2 | 8/2019 | Mailhe et al. |
| 10,395,092 B2 | 8/2019 | Kamiyama et al. |
| 10,430,943 B2 | 10/2019 | Wang et al. |
| 10,430,946 B1 | 10/2019 | Zhou et al. |
| 10,438,096 B2 | 10/2019 | Lesniak |
| 10,444,486 B2 | 10/2019 | Rainbolt et al. |
| 10,445,619 B2 | 10/2019 | Barnes et al. |
| 10,453,195 B2 | 10/2019 | Gholap et al. |
| 10,460,150 B2 | 10/2019 | Jackson et al. |
| 10,475,182 B1 | 11/2019 | Chilamkurhy et al. |
| 10,489,633 B2 | 11/2019 | Molin et al. |
| 10,489,907 B2 | 11/2019 | Rowley Grant et al. |
| 10,504,224 B1 | 12/2019 | Aeffner et al. |
| 10,528,848 B2 | 1/2020 | Madabhushi et al. |
| 10,573,001 B2 | 2/2020 | Bredno et al. |
| 10,573,003 B2 | 2/2020 | Sethi et al. |
| 10,580,130 B2 | 3/2020 | Frangioni |
| 10,585,273 B2 | 3/2020 | Chen et al. |
| 10,595,728 B2 | 3/2020 | Choi et al. |
| 10,607,343 B2 | 3/2020 | Song et al. |
| 10,614,285 B2 | 4/2020 | West et al. |
| 10,650,221 B2 | 5/2020 | Chukka et al. |
| 10,650,520 B1 | 5/2020 | Beck et al. |
| 10,650,557 B2 | 5/2020 | Chang et al. |
| 10,671,832 B2 | 6/2020 | Hamilton |
| 10,706,328 B2 | 7/2020 | Stumpe et al. |
| 10,706,535 B2 | 7/2020 | Arar et al. |
| 10,719,930 B2 | 7/2020 | Avila |
| 10,733,727 B2 | 8/2020 | Putha et al. |
| 10,746,665 B2 | 8/2020 | Kluckner et al. |
| 10,755,412 B2 | 8/2020 | Lindemer et al. |
| 10,765,890 B2 | 9/2020 | Sun et al. |
| 10,769,788 B2 | 9/2020 | Song et al. |
| 10,776,917 B2 | 9/2020 | Allmendinger et al. |
| 10,778,917 B2 | 9/2020 | Kim et al. |
| 10,799,189 B2 | 10/2020 | Nye et al. |
| 10,803,143 B2 | 10/2020 | Kamen et al. |
| 10,811,135 B2 | 10/2020 | Nye et al. |
| 10,818,015 B2 | 10/2020 | Song et al. |
| 10,828,000 B2 | 11/2020 | Amit et al. |
| 10,839,510 B2 | 11/2020 | Mahoor et al. |
| 10,846,367 B2 | 11/2020 | Madabhushi et al. |
| 10,861,151 B2 | 12/2020 | Liang et al. |
| 10,861,156 B2 | 12/2020 | Madabhushi et al. |
| 10,872,411 B2 | 12/2020 | Hattori et al. |
| 10,878,574 B2 | 12/2020 | Mao et al. |
| 10,886,008 B2 | 1/2021 | Kamens et al. |
| 10,891,550 B2 | 1/2021 | Kapur et al. |
| 10,892,050 B2 | 1/2021 | Zhang et al. |
| 10,902,590 B2 | 1/2021 | Takeuchi et al. |
| 10,912,530 B2 | 2/2021 | Mandelkern et al. |
| 10,916,341 B2 | 2/2021 | Stoval, III et al. |
| 10,936,160 B2 | 3/2021 | Sieniek |
| 10,937,162 B2 | 3/2021 | Sarkar |
| 10,937,541 B2 | 3/2021 | Ceballos Lentini et al. |
| 10,943,346 B2 | 3/2021 | Wirch et al. |
| 10,943,350 B2 | 3/2021 | Ward et al. |
| 10,957,041 B2 | 3/2021 | Yip et al. |
| 10,977,479 B2 | 4/2021 | Tracy et al. |
| 10,984,528 B2 | 4/2021 | Hill et al. |

(56) References Cited

U.S. PATENT DOCUMENTS

| | | |
|---|---|---|
| 10,991,092 B2 | 4/2021 | Braun et al. |
| 10,991,097 B2 | 4/2021 | Yip et al. |
| 11,004,559 B2 | 5/2021 | Stoval, III et al. |
| 11,010,610 B2 | 5/2021 | Stumpe |
| 11,010,892 B2 | 5/2021 | Barnes et al. |
| 11,010,897 B2 | 5/2021 | Flohr et al. |
| 11,017,207 B2 | 5/2021 | Prabhudesai et al. |
| 11,017,533 B2 | 5/2021 | Gaire et al. |
| 11,024,415 B2 | 6/2021 | Stoval, III et al. |
| 11,030,744 B2 | 6/2021 | Kapil et al. |
| 11,042,807 B2 | 6/2021 | Kapur et al. |
| 11,049,243 B2 | 6/2021 | Odry et al. |
| 11,049,244 B2 | 6/2021 | Wang et al. |
| 11,062,800 B2 | 7/2021 | Lee et al. |
| 11,069,062 B2 | 7/2021 | Gregson et al. |
| 11,069,439 B2 | 7/2021 | Heismann et al. |
| 11,071,501 B2 | 7/2021 | Buckler et al. |
| 11,074,692 B2 | 7/2021 | Sekiguchi et al. |
| 11,100,359 B2 | 8/2021 | Jang |
| 11,101,032 B2 | 8/2021 | Kohle et al. |
| 11,107,583 B2 | 8/2021 | Madabhushi et al. |
| 11,126,914 B2 | 9/2021 | Thibault et al. |
| 11,154,212 B2 | 10/2021 | Laviolette |
| 11,164,048 B2 | 11/2021 | Stumpe et al. |
| 11,170,545 B2 | 11/2021 | Chandarana et al. |
| 11,170,897 B2 | 11/2021 | Stumpe et al. |
| 11,176,676 B2 | 11/2021 | Rothrock et al. |
| 11,195,274 B2 | 12/2021 | Veidman et al. |
| 11,210,787 B1 | 12/2021 | Godrich et al. |
| 11,211,160 B2 | 12/2021 | Yousfi et al. |
| 11,222,424 B2 | 1/2022 | Sue et al. |
| 11,257,209 B2 | 2/2022 | Barnes et al. |
| 11,263,748 B2 | 3/2022 | Yip et al. |
| 11,288,798 B2 | 3/2022 | Takeuchi et al. |
| 11,308,608 B2 | 4/2022 | Jeon et al. |
| 11,315,251 B2 | 4/2022 | Gholap et al. |
| 11,321,839 B2 | 5/2022 | Jha et al. |
| 11,328,420 B2 | 5/2022 | Bredno et al. |
| 11,348,239 B2 | 5/2022 | Yip et al. |
| 11,348,240 B2 | 5/2022 | Yip et al. |
| 11,348,661 B2 | 5/2022 | Yip et al. |
| 11,367,184 B2 | 6/2022 | Tosun et al. |
| 2003/0163031 A1 | 8/2003 | Madden et al. |
| 2003/0215936 A1 | 11/2003 | Kallioniemi et al. |
| 2005/0123181 A1 | 6/2005 | Freund et al. |
| 2006/0159367 A1 | 7/2006 | Zeineh et al. |
| 2012/0058509 A1 | 3/2012 | Leininger et al. |
| 2012/0232390 A1 | 9/2012 | Park |
| 2014/0187936 A1 | 7/2014 | Nakamura et al. |
| 2014/0193052 A1 | 7/2014 | Yoshihara et al. |
| 2015/0293026 A1 | 10/2015 | Shin et al. |
| 2016/0239962 A1 | 8/2016 | Markin et al. |
| 2016/0275709 A1 | 9/2016 | Gotman et al. |
| 2016/0287201 A1 | 10/2016 | Bergtholdt et al. |
| 2016/0307305 A1 | 10/2016 | Madabhushi et al. |
| 2017/0059843 A1 | 3/2017 | Mangham et al. |
| 2017/0116734 A1 | 4/2017 | Van Leeuwen et al. |
| 2017/0270666 A1 | 9/2017 | Barnes et al. |
| 2018/0089495 A1 | 3/2018 | Black et al. |
| 2018/0096191 A1 | 4/2018 | Wan et al. |
| 2018/0211380 A1 | 7/2018 | Tandon et al. |
| 2018/0348092 A1 | 12/2018 | Suresh et al. |
| 2019/0073804 A1 | 3/2019 | Allmendinger |
| 2019/0080490 A1 | 3/2019 | Schoendube et al. |
| 2019/0101736 A1 | 4/2019 | Chen et al. |
| 2019/0156476 A1 | 5/2019 | Yoshida et al. |
| 2019/0164279 A1 | 5/2019 | Ionasec |
| 2019/0228547 A1 | 7/2019 | Chandarana et al. |
| 2019/0244681 A1 | 8/2019 | Gurcan et al. |
| 2019/0252044 A1 | 8/2019 | Schmidt |
| 2019/0261938 A1 | 8/2019 | Sevenster et al. |
| 2019/0266436 A1 | 8/2019 | Prakash et al. |
| 2019/0266486 A1 | 8/2019 | Yamada et al. |
| 2019/0266726 A1 * | 8/2019 | Madabhushi ......... G06T 7/0012 |
| 2019/0340468 A1 * | 11/2019 | Stumpe ................. G16H 30/40 |
| 2019/0347557 A1 | 11/2019 | Khan |
| 2019/0355114 A1 | 11/2019 | Muehlberg et al. |
| 2020/0035350 A1 | 1/2020 | Sullivan et al. |
| 2020/0066407 A1 | 2/2020 | Stumpe et al. |
| 2020/0105413 A1 | 4/2020 | Vladimirova et al. |
| 2020/0129114 A1 | 4/2020 | Griffith et al. |
| 2020/0138395 A1 | 5/2020 | Tsuchiya et al. |
| 2020/0139361 A1 | 5/2020 | Leavitt et al. |
| 2020/0184643 A1 | 6/2020 | Coudray et al. |
| 2020/0193656 A1 | 6/2020 | Schoendube et al. |
| 2020/0219252 A1 | 7/2020 | Tsuyuki |
| 2020/0226462 A1 | 7/2020 | Maddison et al. |
| 2020/0250817 A1 | 8/2020 | Leng et al. |
| 2020/0250820 A1 | 8/2020 | Kunze et al. |
| 2020/0265579 A1 | 8/2020 | Schmidt-Richberg et al. |
| 2020/0272864 A1 | 8/2020 | Faust et al. |
| 2020/0273218 A1 | 8/2020 | Camino et al. |
| 2020/0279354 A1 * | 9/2020 | Klaiman ................ G06N 20/00 |
| 2020/0279411 A1 | 9/2020 | Atria et al. |
| 2020/0293748 A1 | 9/2020 | Avenel et al. |
| 2020/0294231 A1 | 9/2020 | Tosun et al. |
| 2020/0311931 A1 | 10/2020 | Yeh et al. |
| 2020/0327662 A1 | 10/2020 | Liu et al. |
| 2020/0334814 A1 | 10/2020 | Gholap et al. |
| 2020/0342588 A1 | 10/2020 | Caldwell, Jr. et al. |
| 2020/0349707 A1 | 11/2020 | Hosseini et al. |
| 2020/0357516 A1 | 11/2020 | Kirby et al. |
| 2020/0372235 A1 | 11/2020 | Peng et al. |
| 2020/0372635 A1 | 11/2020 | Viedman et al. |
| 2020/0372638 A1 | 11/2020 | Gregson et al. |
| 2020/0381122 A1 | 12/2020 | Godrich et al. |
| 2020/0388028 A1 | 12/2020 | Agus et al. |
| 2020/0394825 A1 | 12/2020 | Stumpe et al. |
| 2020/0395123 A1 | 12/2020 | Akselrod-Ballin et al. |
| 2020/0410672 A1 | 12/2020 | Katscher et al. |
| 2021/0004997 A1 | 1/2021 | Manhart et al. |
| 2021/0005308 A1 | 1/2021 | Klaiman |
| 2021/0007694 A1 | 1/2021 | Hein et al. |
| 2021/0019342 A1 | 1/2021 | Peng et al. |
| 2021/0022715 A1 | 1/2021 | Brattain et al. |
| 2021/0027459 A1 | 1/2021 | Madabhushi et al. |
| 2021/0043331 A1 | 2/2021 | Ozcan et al. |
| 2021/0049345 A1 | 2/2021 | Johnson et al. |
| 2021/0050094 A1 | 2/2021 | Orringer et al. |
| 2021/0056717 A1 | 2/2021 | Ranganathan et al. |
| 2021/0064845 A1 | 3/2021 | Stumpe et al. |
| 2021/0073984 A1 | 3/2021 | Locke et al. |
| 2021/0073986 A1 | 3/2021 | Kapur et al. |
| 2021/0089744 A1 | 3/2021 | Ianni et al. |
| 2021/0090238 A1 | 3/2021 | Gallagher-Gruber et al. |
| 2021/0090247 A1 | 3/2021 | Jeon et al. |
| 2021/0090251 A1 | 3/2021 | Jha et al. |
| 2021/0103797 A1 | 4/2021 | Jang |
| 2021/0104039 A1 | 4/2021 | Arai et al. |
| 2021/0113190 A1 | 4/2021 | Errico et al. |
| 2021/0118136 A1 | 4/2021 | Hassan-Shafique et al. |
| 2021/0133958 A1 | 5/2021 | Chen |
| 2021/0142111 A1 | 5/2021 | Yao et al. |
| 2021/0142908 A1 | 5/2021 | Lahrmann |
| 2021/0150701 A1 | 5/2021 | Thagaard et al. |
| 2021/0151170 A1 | 5/2021 | Shi |
| 2021/0158933 A1 | 5/2021 | Frosch et al. |
| 2021/0158961 A1 | 5/2021 | Sharma et al. |
| 2021/0174147 A1 | 6/2021 | Otsuka |
| 2021/0177296 A1 | 6/2021 | Saalbach et al. |
| 2021/0181287 A1 | 6/2021 | Sommer et al. |
| 2021/0192729 A1 | 6/2021 | Raciti et al. |
| 2021/0208227 A1 | 7/2021 | Hardy et al. |
| 2021/0209753 A1 | 7/2021 | Dogdas et al. |
| 2021/0209760 A1 | 7/2021 | Sue et al. |
| 2021/0216745 A1 | 7/2021 | Gildenblat et al. |
| 2021/0217166 A1 | 7/2021 | Graule et al. |
| 2021/0233215 A1 | 7/2021 | Manhart |
| 2021/0233236 A1 | 7/2021 | Dogdas et al. |
| 2021/0233251 A1 | 7/2021 | Rothrock et al. |
| 2021/0233642 A1 | 7/2021 | Sue et al. |
| 2021/0241121 A1 | 8/2021 | Tong et al. |
| 2021/0249118 A1 | 8/2021 | Papagiannakis et al. |
| 2021/0256699 A1 | 8/2021 | Wainrib et al. |

(56) References Cited

U.S. PATENT DOCUMENTS

| | | |
|---|---|---|
| 2021/0264591 A1 | 8/2021 | Park et al. |
| 2021/0264595 A1 | 8/2021 | Plesch et al. |
| 2021/0279864 A1 | 9/2021 | Madabhushi et al. |
| 2021/0279875 A1 | 9/2021 | Saur et al. |
| 2021/0280311 A1 | 9/2021 | Naik et al. |
| 2021/0287778 A1 | 9/2021 | Yousfi et al. |
| 2021/0304405 A1 | 9/2021 | Cho et al. |
| 2021/0312620 A1 | 10/2021 | Zuo et al. |
| 2021/0343012 A1 | 11/2021 | Xiao et al. |
| 2022/0189133 A1* | 6/2022 | Fuchs .................. G06V 20/695 |
| 2022/0318979 A1* | 10/2022 | Chen ......................... G06T 7/40 |
| 2022/0366619 A1* | 11/2022 | Alemi ....................... G06T 7/90 |
| 2023/0059717 A1* | 2/2023 | Madabhushi ......... G06T 7/0012 |
| 2023/0115733 A1* | 4/2023 | Oldfather .............. G06T 7/0012 382/133 |
| 2023/0377154 A1* | 11/2023 | Cheng .................. G06T 7/0014 |
| 2024/0044771 A1* | 2/2024 | Allier .................... G06V 10/454 |
| 2024/0232242 A1* | 7/2024 | Ge ........................ G06V 20/698 |
| 2024/0233347 A1* | 7/2024 | Ba .......................... G06T 7/0012 |

OTHER PUBLICATIONS

Janowczyk, A., et al., "HistoQC: An Open-Source Quality Control Tool for Digital Pathology Slides," JCO Clinical Cancer Informatics, vol. 3, 2019 (Published online Apr. 16, 2019), pp. 1-7, doi: 10.1200/CCI.18.00157. PMID: 30990737; PMCID: PMC6552675.

Janowczyk, A., et al., Supplemental Material to "HistoQC: An Open-Source Quality Control Tool for Digital Pathology Slides," CCI.1800157, 2019, pp. 1-9.

Kapur, S., et al., (Applicant: PAIGE.AI, Inc.), "Systems and Methods for Processing Images to Classify the Processed Images for Digital Pathology," International Application No. PCT/US2020/033161 filed May 15, 2020, 48 pages.

Kapur, S., et al., "Classification of Tissue Specimen from Digital Pathology Images Using Machine Learning," U.S. Appl. No. 62/848,703, filed May 16, 2019, 20 pages.

Liu, J., et al., "An End-to-End Deep Learning Histochemical Scoring System for Breast Cancer TMA," IEEE Transactions on Medical Imaging, vol. 38, No. 2, Feb. 2019, pp. 617-628.

Pinard, R., et al., "Methods and System for Validating Sample Images for Quantitative Immunoassays," U.S. Appl. No. 60/954,303, filed Aug. 6, 2007, 63 pages total.

Thomas, Shane (PCT Authorized Officer), Transmittal of the International Search Report and the Written Opinion of the International Searching Authority, or the Declaration issued May 12, 2023 in corresponding PCT Application No. PCT/US2023/013126, 8 pages.

* cited by examiner

| |
|---|
| Convolution 3 x 3, filters 64, S = [2 2], P = [3 3 3 3] |
| Batch Normalization |
| ReLu Activation |
| Max Pooling 3 x 3, S = [2 2], P = [1 1 1 1] |
| Residual Block-2A<br>Convolution 3 x 3, filters = 64, S = [1 1], P = [1 1 1 1] |
| ReLu Activation |
| Residual Block-2B<br>Convolution 3 x 3, filters = 64, S = [1 1], P = [1 1 1 1] |
| ReLu Activation |
| Residual Block-3A<br>Convolution 3 x 3, filters = 128, S = [2 2], P = [1 1 1 1]<br>Convolution 1 x 1, filters = 128, S = [2 2], P = [0 0 0 0] |
| ReLu Activation |
| Residual Block-3B<br>Convolution 3 x 3, filters = 128, S = [1 1], P = [1 1 1 1] |
| ReLu Activation |
| Residual Block-4A<br>Convolution 3 x 3, filters = 256, S = [2 2], P = [1 1 1 1]<br>Convolution 1 x 1, filters = 256, S = [2 2], P = [0 0 0 0] |
| ReLu Activation |
| Residual Block-4B<br>Convolution 3 x 3, filters = 128, S = [2 2], P = [1 1 1 1] |
| ReLu Activation |
| Residual Block-5A<br>Convolution 3 x 3, filters = 512, S = [2 2], P = [1 1 1 1]<br>Convolution 1 x 1, filters = 512, S = [2 2], P = [0 0 0 0] |
| ReLu Activation |
| Residual Block-5B<br>Convolution 3 x 3, filters = 512, S = [1 1], P = [1 1 1 1] |
| ReLu Activation |
| Average Pooling 7 x 7, S = [7 7], P = [0 0 0 0] |
| Three Sigmoid Heads |

DIGITAL PATHOLOGY ARTIFICIAL INTELLIGENCE QUALITY CHECK

RELATED APPLICATION

This application claims priority to U.S. Provisional Patent Application No. 63/310,741, entitled, "Digital Pathology Artificial Intelligence Quality Check," and filed Feb. 16, 2022, which is hereby incorporated by reference in its entirety.

FIELD

This disclosure relates generally to digital pathology. More particularly, this disclosure relates to digital images of tissue samples.

BACKGROUND

Digital pathology generally includes capturing digital images of tissue samples. Digital pathology may use machine learning to automatically classify the tissue samples of such digital images, e.g., according to a proposed diagnosis. In general, machine learning techniques may be trained using a large number of labeled images, where the labels indicate the particular tissue class.

SUMMARY

According to various embodiments, a method of automated quality control for digital pathology whole slide images is presented. The method includes: obtaining a thumbnail image derived from a whole slide image of a pathology slide, wherein the thumbnail image has a lower resolution than a resolution of the whole slide image; determining whether the whole slide image includes an artifact in a first class of artifacts, wherein the determining whether the whole slide image includes an artifact in the first class of artifacts comprises providing the thumbnail image to an electronic neural network, wherein the electronic neural network is trained to detect artifacts in the first class of artifacts by analyzing a plurality of labeled training thumbnail images; generating a tissue mask representing tissue depicted in the thumbnail image; determining whether the whole slide image includes an artifact in a second class of artifacts, wherein the determining whether the whole slide image includes an artifact in the second class of artifacts comprises performing a comparison using the tissue mask; and providing an indication of whether the whole slide image includes an artifact in the first class of artifacts or an artifact in the second class of artifacts.

Various optional features of the above embodiments include the following. The method may include scanning the pathology slide using a high-resolution camera of a whole slide image scanner. The method may include automatically re-scanning the pathology slide to obtain a replacement whole slide image upon a determination that the whole slide image includes an artifact in the first class of artifacts or an artifact in the second class of artifacts. The first class of artifacts may include: pen mark, air bubble, out-of-focus, and tissue fold. The first class of artifacts may include: misplaced coverslip and periodic scanning error. The second class of artifacts may include: absent tissue, partially missing tissue, and misplaced tissue. The comparison may include comparing the tissue mask to an edge template to detect partially missing tissue. The comparison may include comparing the tissue mask to a second tissue mask generated from a macro image of the pathology slide to detect partially missing tissue, wherein the macro image is obtained using a camera with a lower resolution than a resolution of a camera used to obtain the whole slide image. The comparison may include comparing a count of pixels representing tissue in the tissue mask to a predetermined threshold to detect absent tissue. The generating the tissue mask may be performed using an electronic neural network trained using a plurality of labeled training thumbnail images. The method may include determining whether the whole slide image includes H&E staining. The determining whether the whole slide image includes H&E staining may include providing the thumbnail image to the electronic neural network. The method may include storing the thumbnail image in a database in association with a label indicating whether the whole slide image includes an artifact in the first class of artifacts or an artifact in the second class of artifacts, wherein the database is searchable according to artifact type.

According to various embodiments, a system for automated quality control for digital pathology whole slide images is presented. The system includes an electronic processor and non-transitory persistent storage containing instructions that, when executed by the electronic processor, configure the electronic processor to perform actions comprising: obtaining a thumbnail image derived from a whole slide image of a pathology slide, wherein the thumbnail image has a lower resolution than a resolution of the whole slide image; determining whether the whole slide image includes an artifact in a first class of artifacts, wherein the determining whether the whole slide image includes an artifact in the first class of artifacts comprises providing the thumbnail image to an electronic neural network, wherein the electronic neural network is trained to detect artifacts in the first class of artifacts by analyzing a plurality of labeled training thumbnail images; generating a tissue mask representing tissue depicted in the thumbnail image; determining whether the whole slide image includes an artifact in a second class of artifacts, wherein the determining whether the whole slide image includes an artifact in the second class of artifacts comprises performing a comparison using the tissue mask; and providing an indication of whether the whole slide image includes an artifact in the first class of artifacts or an artifact in the second class of artifacts.

Various optional features of the above embodiments include the following. The actions may further include scanning the pathology slide using a high-resolution camera of a whole slide image scanner. The actions may further include automatically re-scanning the pathology slide to obtain a replacement whole slide image upon a determination that the whole slide image includes an artifact in the first class of artifacts or an artifact in the second class of artifacts. The first class of artifacts may include: pen mark, air bubble, out-of-focus, and tissue fold. The first class of artifacts may include: misplaced coverslip and periodic scanning error. The second class of artifacts may include: absent tissue, partially missing tissue, and misplaced tissue. The comparison may include comparing the tissue mask to an edge template to detect partially missing tissue. The comparison may include comparing the tissue mask to a second tissue mask generated from a macro image of the pathology slide to detect partially missing tissue, wherein the macro image is obtained using a camera with a lower resolution than a resolution of a camera used to obtain the whole slide image. The comparison may include comparing a count of pixels representing tissue in the tissue mask to a predetermined threshold to detect absent tissue. The generating the tissue mask may be performed using an electronic neural network trained using a plurality of labeled training thumbnail images. The actions may further include determining whether the whole slide image includes H&E staining. The determining whether the whole slide image includes H&E staining may include providing the thumbnail image to the electronic neural network. The actions may further include storing the thumbnail image in a database in association with a label indicating whether the whole slide image includes an artifact in the first class of artifacts or an artifact in the second class of artifacts, wherein the database is searchable according to artifact type.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 5 depicts a ResNet architecture for a slide level deep learning model for detecting the presence of an artifact on a high resolution whole slide image by detecting the presence of such an artifact on a thumbnail derived from the high resolution whole slide image;

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments automatically detect quality artifacts in digital images of pathology samples, such as whole-slide images, including quality artifacts that result from slide preparation and/or from the use of whole slide image scanners. Such quality artifacts may include, by way of non-limiting example, any, or any combination, of: absent tissue, partially missing tissue (e.g., partially excluded tissue or misplaced tissue), out of focus tissue portions, air bubbles, a presence of pen or other extraneous markings, folded tissue, a misplaced coverslip, and/or periodic scanning errors.

Embodiments may be used for quality checking digital pathology images in any of a variety of places in a digital pathology pipeline. Some embodiments may provide automated quality control as a workflow acceleration feature that detects quality artifacts in advance of review by a pathologist. Some embodiments may be used to generate a training corpus of digital images so as to exclude images, or image portions, that include quality artifacts. Some embodiments may be used within a diagnostic processing pipeline, e.g., to perform quality checking of a patient's pathology digital image prior to automated or manual diagnosis. Some embodiments may be used in a research setting, e.g., for clinical trials, or in a pharmaceutical setting, e.g., for drug research. Embodiments may be used to both accelerate the speed, and improve the quality, of research.

Embodiments have many advantages. For example, some embodiments eliminate subjective human decision making from quality control processing. Some embodiments provide rules-driven, objective, computer-based actions for digital pathology quality control. Some embodiments automatically rescan a pathology slide if an initial scan was unsuccessful without a human ever viewing the scanned image. Some embodiments that utilize machine learning efficiently process data, and thus, reduce resource consumption. Some embodiments that utilize machine learning leverage thousands or even millions of labeled images, which cannot be processed by a person.

These and other features and advantages are disclosed in detail herein.

Figure 1:
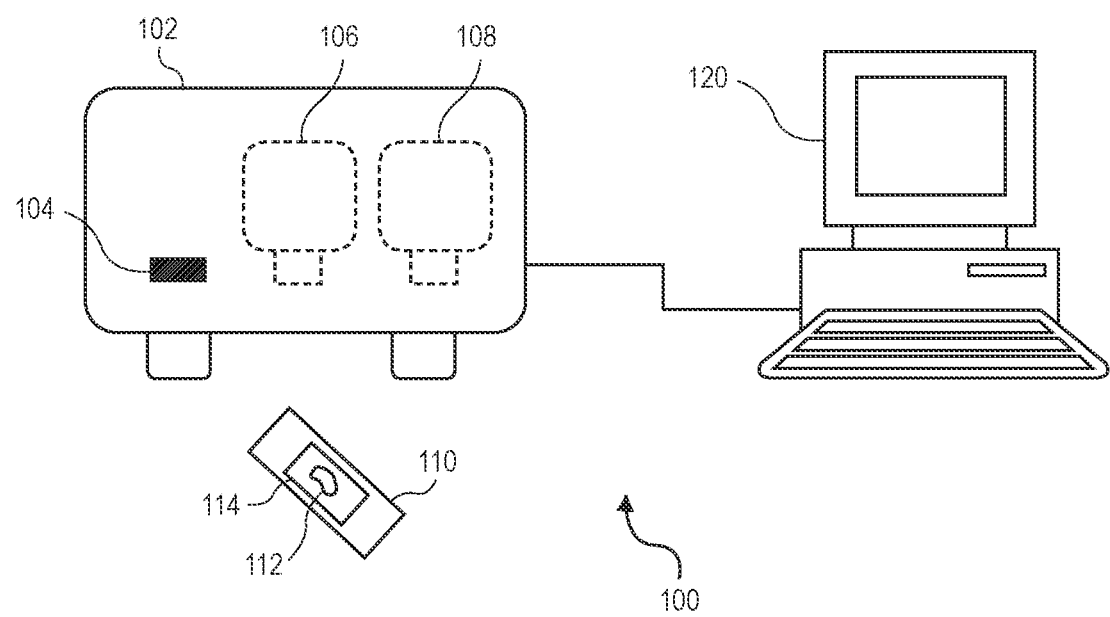
FIG. 1 is a schematic diagram of a system for automated quality control for digital pathology whole slide images.

FIG. 1 is a schematic diagram of a system 100 for automated quality control for digital pathology whole slide images. The system 100 can identify image or slide quality artifacts, e.g., quality issues, present on digital pathology images, such as by way of non-limiting example, whole slide images.

Shown in FIG. 1 is a pathology slide 110, which includes a tissue sample 112. The tissue sample 112 may be, by way of non-limiting example, a formalin-fixed paraffin-embedded (FFPE) hematoxylin and eosin (H&E) stained tissue sample. Other stains, such as by way of non-limiting example, special stains or immunohistochemistry (IHC) stains, may be used in the alternative. The tissue sample 122 may be covered by a coverslip 114.

Various undesirable artifacts may be introduced into the pathology slide 110 during its preparation. Descriptions of non-limiting slide preparation artifacts follow.

For example, a pathologist or other medical professional may place marks on the pathology slide 110, e.g., pen markings. The markings may be on any area of the pathology slide 110, tissue or non-tissue. Such markings may introduce bias if slides are used to train machine learning diagnostic techniques, as pathologists tend to mark pathological features and the machine learning techniques may learn to interpret markings as pathology indications.

As another undesirable artifact example, the tissue sample 112 may be misplaced on the pathology slide, e.g., touching an edge of the pathology slide 110 and/or the edge of the coverslip 114. This may cause the tissue sample 112 to be exposed to air, which may lead to additional artifacts, such as air bubbles.

Air bubbles are another example of an undesirable artifact. Air bubbles may be present under the coverslip 114, e.g., when the mounting medium is too thin or there is not enough mounting medium applied. As the slide dries, more air may get under the edges of the coverslip and tissue may turn brown and dry up, resulting in a slide that is not readable by a pathologist or automated diagnostic technique.

As yet another undesirable artifact example, the coverslip 114 may be misplaced, such that its edge overlaps the tissue sample 112. A misplaced coverslip 114 may lead to many of the same additional artifacts as may be produced by a misplaced tissue sample 112, e.g., air bubbles, and discolored and/or dried tissue.

As yet another undesirable artifact example, the tissue sample 112 may be folded such that one part of the tissue sample 112 overlaps another part of the tissue sample 112. Such overlap may cause a bulge that allows air to enter under the coverslip 114, which may result in air bubbles and/or drying of the tissue sample 112. Further, overlap may result in misdiagnosis, either automated or human-produced, as overlapped tissue has a different appearance from that of a single-layer tissue sample 112.

The system 100 includes a slide scanner 102. The slide scanner can capture digital images of pathology slides, such as the pathology slide 110 shown in FIG. 1. Thus, the slide scanner 102 includes one or more cameras, such as the high resolution camera 106 and/or the low resolution camera 108. The slide scanner 102 accepts pathology slides, such as the pathology slide 110, via a port 104. The pathology scanner 102 automatically captures one or more images using its cameras 106, 108.

The high resolution camera 106 may be used to capture a high resolution whole slide image with a resolution of 0.5 to 0.25 microns per pixel or less, with a number of pixels ranging from, e.g., 80,000×60,000 to 200,000×100,000 or more. The high resolution whole slide image captured using the high resolution camera 106 may occupy 1-4 gigabytes of electronic storage or more, even when compressed.

The low resolution camera 108 may capture a low-resolution image of the slide, referred to as a macro image. The macro image may have a number of pixels that ranges 800×300 pixels to 1600×600 pixels or more. The low resolution camera 108 may capture a single macro image of the entire pathology slide 110 at once.

The high resolution camera 106 may capture only a portion of the pathology slide 110 at once. The slide scanner 102 may move the high resolution camera and/or a bed on which the pathology slide 110 is situated in order to capture image portions covering the entire pathology slide 110, and electronically knit together the image portions to generate the high resolution whole slide image. In general, the image portions may be captured in a raster pattern, e.g., by capturing multiple patches or ribbons of image portions. For example, the slide scanner 110 may capture square image portions along a ribbon of the pathology slide 110, then move to an adjacent ribbon, etc. To save time, the slide scanner may only capture images of portions of the pathology slide that contain tissue. Therefore, the slide scanner 102 may first acquire the macro image and utilize it to determine which portions of the pathology slide 110 include tissue in order to direct image capture of such portions by the high resolution camera 106.

The image capture process for high resolution whole slide images may introduce artifacts in the captured image. Descriptions of non-limiting scanning artifacts follow.

For example, one or more portions of the high resolution whole slide image may be out of focus. This may occur for various reasons, such as the auto-focus mechanism failing. The out of focus portions may include all the tissue on the slide, select pieces of tissue, or one or more small areas of tissue. The out of focus portions may result in a situation, which may be repeated, where one ribbon is in focus and an adjacent ribbon is out of focus. Out of focus portions can occur in square or rectangular sections, which may be one or more ribbons wide.

Another example artifact is periodic scanning errors, which may appear as checkerboard or striping pattern, e.g., in greyscale. In general, such periodic scanning errors may be due to the slide scanner failing to adequately capture patch or ribbon image portions during its image capture operation. Such inadequate capture may be due to, for example, the scanner being physically jarred or bumped, or the scanner illumination having a strobe effect that unfavorably interacts with the image capture process, e.g., to produce sub-Nyquist frequency sampling errors.

As another artifact example, the image capture process may omit scanning a portion of tissue, resulting in the high resolution whole slide image partially missing tissue. While the missing portion of tissue may be present on the pathology slide, it may be missing from the high resolution whole slide image. This may occur due to errors in the tissue detection of the slide scanner 102 as applied to the macro image, for example. An example of partially missing tissue is due to poor scanner detection, which may occur at edges of small pieces of tissue, usually resulting in a straight edge of tissue, or a sharp ending of the tissue, as depicted in the high resolution whole slide image. The high resolution scanning process omitting scanning a portion of tissue, resulting in a sharp edge, is referred to herein as a tissue cutoff artifact, which is a type of partially missing tissue artifact. Another example of a partially missing tissue artifact may occur when one or more entire pieces of tissue are missing in the high resolution scanned image, e.g., when the tissue sample 114 includes multiple discrete pieces and fewer than all pieces get scanned. This is referred to herein as a partially excluded tissue artifact, which is another type of partially missing tissue artifact.

Yet another artifact example is a complete absence of tissue depicted in the high resolution whole slide image. The whole slide image may be entirely white or black, for example. This artifact may occur due to a complete tissue detection failure as applied to the macro image, for example, or due to operator error when obtaining the whole slide image, e.g., an operator inadvertently passing a blank slide to the slide scanner 102.

The slide scanner 102 may include, or be coupled to, a controlling computer. As shown in FIG. 1, by way of non-limiting example, the slide scanner 102 is coupled to a controlling computer 120. The controlling computer, e.g., the controlling computer 120, may direct actions of the slide scanner 102 such as image capture and storage of captured images, e.g., in electronic persistent storage. Such electronic persistent storage may be local, e.g., present in the slide scanner 102 and/or a controlling computer such as the controlling computer 120, or may be remote, such as in a database and/or in a cloud storage environment. The controlling computer 120 may include an electronic processor and non-transitory persistent storage that includes instructions that, when executed by the electronic processor, configure the electronic processor to perform methods as disclosed herein, e.g., as shown and described in reference to FIG. 7.

The controlling computer, such as the controlling computer 120, may generate one or more low resolution images, referred to as thumbnail images, from a high resolution whole slide image captured by the high resolution camera 106. Such thumbnail images may be generated through downsampling, for example, and may be much smaller and with a lower resolution than that of the high resolution image from which it is derived. Typical thumbnail pixel sizes depend on the magnification of the generated thumbnail image; a thumbnail image generated at 20 microns per pixel, for example, may have an average image size close to 1280×1280 pixels, whereas a thumbnail image generated at 10 microns per pixel may have an average image size close to 2560×2560 pixels. According to various embodiments, multiple thumbnail images of varying size may be generated from the same high resolution whole slide image.

Thus, the slide scanner 102 may capture and/or generate high resolution whole slide images, low resolution macro images, and low resolution thumbnail images of the same pathology slide, e.g., the pathology slide 110.

Embodiments may utilize an ensemble of models to detect quality artifacts and classify stains as disclosed herein.

Figure 2:
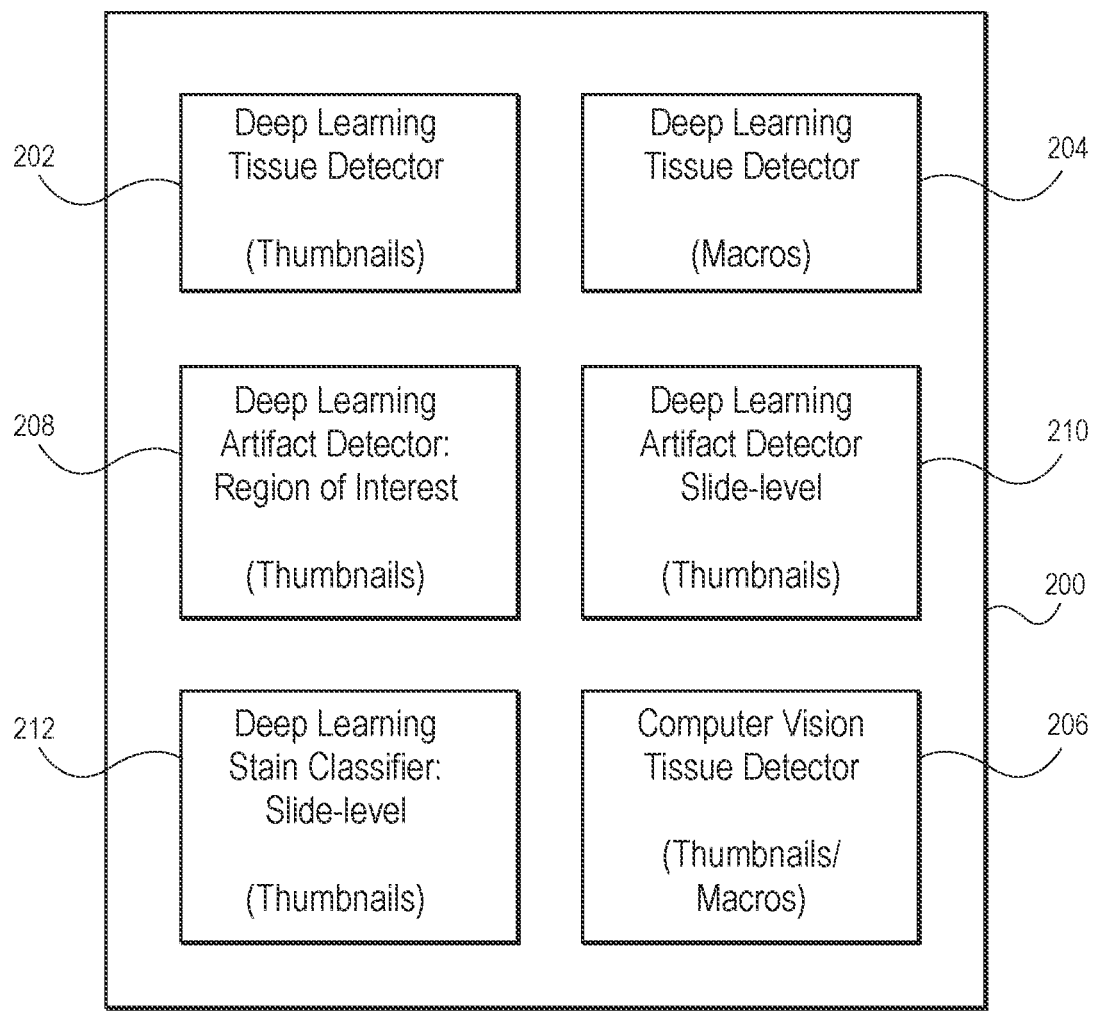
FIG. 2 is a schematic diagram of an ensemble of models according to various embodiments.

FIG. 2 is a schematic diagram of an ensemble 200 of models 202, 204, 206, 208, 210, 212 according to various embodiments. The ensemble of models 200 may be implemented in the controlling computer of the slide scanner 102, e.g., the controlling computer 120, as shown and described herein in reference to FIG. 1. For example, the ensemble of models 200 may be implemented in a slide scanner, such as the slide scanner 102, or may be implemented in a computer that is communicatively coupled to a slide scanner. The ensemble of models 200 includes a region of interest deep learning artifact detector 208 for thumbnail images, a slide level deep learning artifact detector 210 for thumbnail images, a slide level deep learning stain classifier 212 for thumbnails, and up to three models for tissue detection: a computer vision tissue detector 206 for both thumbnail images and macro images, a deep learning tissue detector 202 for thumbnail images, and a deep learning tissue detector 204 for macro images.

According to various embodiments, functions of the various deep learning detectors 202, 203, 208, 210, 212 may be combined and/or overlap. For example, a single deep learning detector may perform some or all of the detections described herein in reference to the region of interest deep learning detector 208 and the deep learning tissue detector 202 for thumbnail images. As another example, some or all of the region of interest detections may be performed by the same deep learning model. As another example, some or all of the slide level detections may be performed by the same deep learning model (e.g., the functions of the slide level deep learning artifact detector 210 and the functions of the slide level deep learning stain classifier 212 may be performed by the same deep learning model). As another example, some or all of the region of interest and slide level detections may be performed by the same deep learning model. In general, the terms "slide level" and "region of interest" are intended to be descriptive of example embodiments, rather than limiting. In general, any detection described herein as "slide level" may be performed by detecting it at the slide level or by detecting a region of interest, and any detection described herein as "region of interest" may be detected by detecting a region of interest or at the slide level.

Figure 3:
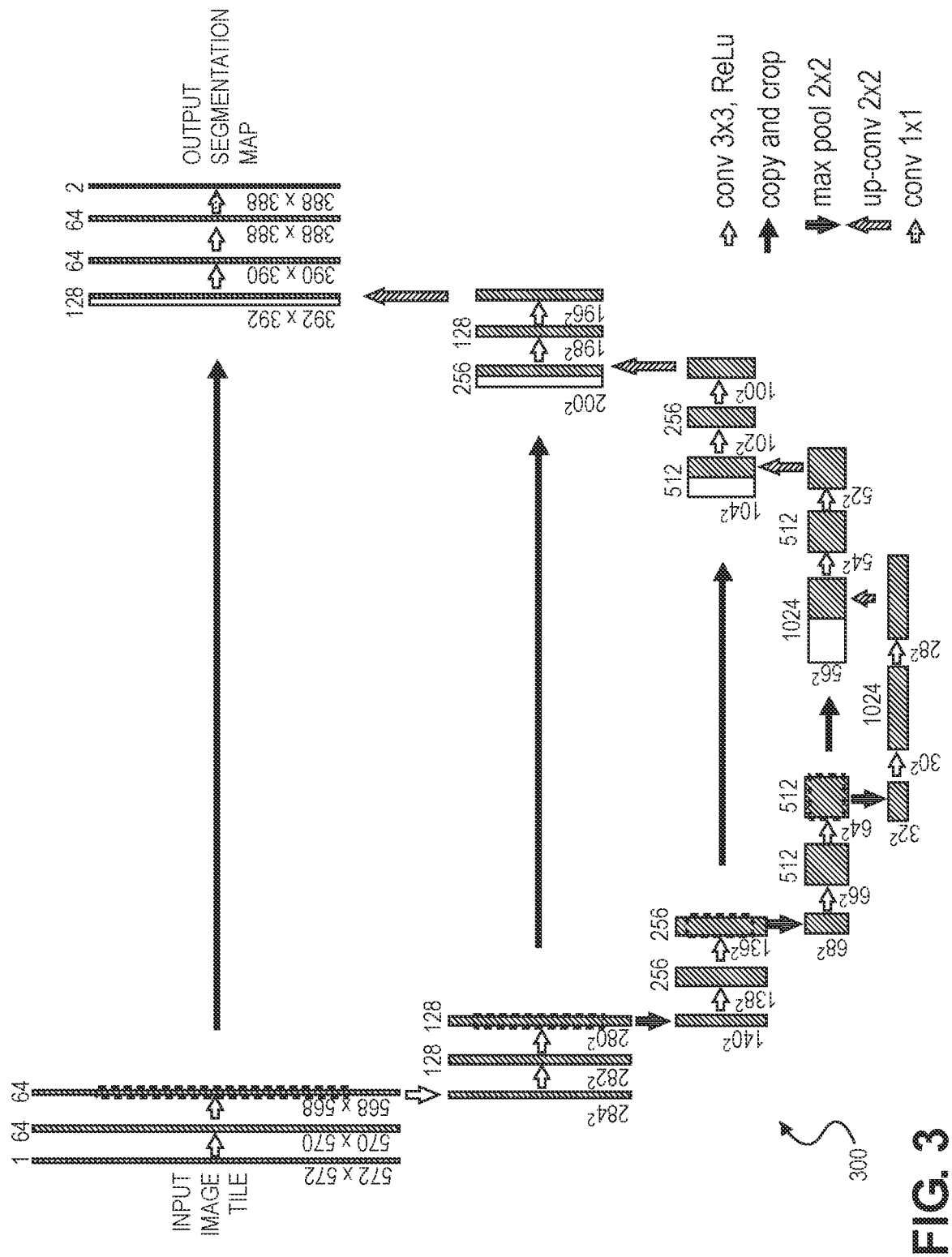
FIG. 3 depicts a UNet architecture for a region of interest deep learning model for detecting an artifact on a high resolution whole slide image by detecting such an artifact on a thumbnail derived from the high resolution whole slide image.
Figure 4:
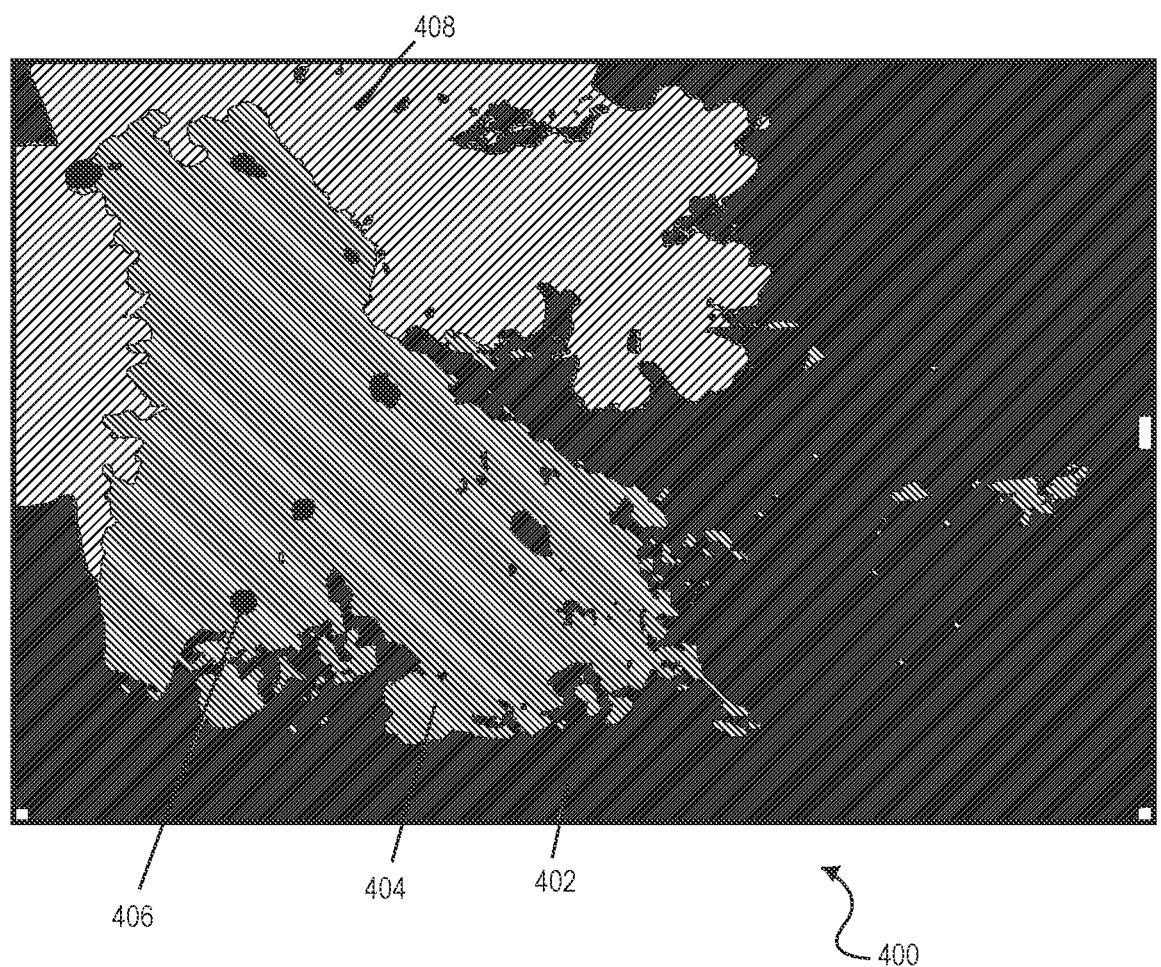
FIG. 4 depicts an annotation of an image, indicating pixels classified as background, tissue, pen markings, and an air bubble.

A non-limiting example region of interest deep learning artifact detector 208 is described presently in reference to FIGS. 3 and 4. The computer vision tissue detector 206, the deep learning tissue detector 202 for thumbnail images, and the deep learning tissue detector 204 for macro images are described in reference to, and following, the description of FIG. 3. A non-limiting example slide level deep learning artifact detector 210 and a non-limiting example deep learning stain classifier 212 are described below in reference to FIGS. 5 and 6.

FIG. 3 depicts a UNet architecture 300 for a region of interest deep learning model for detecting an artifact, such as a slide marking (e.g., pen marking), air bubble, out of focus portion, or tissue fold, on a high resolution whole slide image by detecting such an artifact on a thumbnail derived from the high resolution whole slide image. The region of interest deep learning artifact detector 208 as shown and described herein in reference to FIG. 2 may include an electronic neural network that uses such a UNet architecture 300.

The UNet architecture 300 includes a contracting path (left side) and an expansive path (right side). The contracting path includes repeated blocks of two 3×3 convolutions, each followed by a rectified linear unit (ReLU) activation layer and a 2×2 max pooling operation with stride 2 for downsampling. At each downsampling step, the number of feature channels are doubled. The UNet architecture is superior to a standard convolutional neural network because it operates on features at multiple resolutions to segment artifacts, mixing information from both zoomed out and zoomed in views of the image. Every step in the expansive path includes bilinear upsampling of the feature map followed by two 3×3 convolutions that halve the number of feature channels and a concatenation with the correspondingly cropped feature map from the contracting path, followed by a ReLU activation layer. At the final layer, a 1×1 convolution is used to map each 64-component feature vector to the desired number of classes. According to some embodiments, there may be six such classes:

(1) a background class;
(2) a tissue class;
(3) a pen ink class;
(4) an air bubble class;
(5) an out of focus class; and
(6) a tissue fold class.

The UNet architecture 300 may perform classification at a pixel level, where each individual pixel in an image is categorized into one of the five classes above. FIG. 4 depicts an example pixelwise annotation of an image showing multiple such classes. In total, the network may have 23 convolutional layers, by way of non-limiting example.

According to various embodiments, the UNet architecture 300 may utilize dilated convolutions, which are not part of standard UNet architecture. Dilated convolutions are a type of convolution that increase the receptive field of a convolution layer by widening the convolution kernel by inserting holes between the kernel elements. An additional parameter (dilation rate) indicates how much the kernel is widened:

$$(F*k)(p) = \Sigma_{s+t=p} F(s)k(t) \quad \text{(standard convolution)}$$

$$(F*_l k)(p) = \Sigma_{s+lt=p} F(s)k(t) \quad \text{(dilated convolution)}$$

Some embodiments may support dilated convolutions, but may not enable dilated convolutions by default. Dilated convolutions allow each feature channel in the network to accumulate information from a wider field of view incorporating more pixels than a non-dilated convolutional kernel. This wider field of view allows each informational feature channel in the dilated model to incorporate information across a larger number of pixels than the non-dilated model to classify pixels in the image.

Some embodiments support a number of objective functions, with a default objective function as the Cross Entropy Loss function, which may be characterized as follows, by way of non-limiting example:

$$\text{loss}(x, \text{class}) = -\log\left(\frac{\exp(x[\text{class}])}{\sum_j \exp(x[j])}\right) = -x[\text{class}] + \log\left(\sum_j \exp(x[j])\right)$$

In the above equation, [class] belongs to one of a number of defined classes, such as one of the six classes above. As the UNet classifies at a pixel level, the loss is calculated at a pixel level. Some embodiments may also support class weights if a user desires to weigh one class more than the other by the following objective function change:

$$\text{loss}(x, \text{class}) = \text{weight}[\text{class}]\left(-x[\text{class}] + \log\left(\sum_j \exp(x[j])\right)\right)$$

A separate module to separately calculate the class distribution in order to derive the weights may be used, but some embodiments may use an unweighted Cross Entropy Loss by default.

In general, the region of interest deep learning artifact detector 208, which may include the UNet architecture 300, may be trained using a plurality, e.g., thousands, tens of thousands, hundreds of thousands, or millions, of annotated training images. Each training image may be the same size as a thumbnail image. Each training image may depict tissue and a background, as well as one or more artifacts, e.g., one or more markings (e.g., pen markings), air bubbles, and/or out of focus portions. Each training image may be annotated by associating a label, e.g., a class number, with each pixel in the training image. For example, each training image may be annotated by associating each of its pixels with a numeral, e.g., 1 for background, 2 for tissue, 3 for pen ink, 4 for air bubble, 5 for out of focus, and 6 for tissue fold. FIG. 4 shows an annotation of an image, visually depicting a plurality of such classes.

To train the region of interest artifact deep learning model 208 on pixels that are especially useful for learning artifact features, a machine learning model may be trained while focusing the model on artifact regions using a class-aware cropping scheme. To train the model effectively, the model may be trained on batches of input images, e.g., batches may be stacks of multiple images. For example, thumbnails may be too large on their own to be batched and read into GPU memory without cropping the thumbnail. Crops for training the model may be random. However, instead of using random cropping, some embodiments train models with a random cropping module that focuses on taking a crop containing priority classes. The class priority may be set according to the frequency of each class in the dataset (for instance background pixels may be the most numerous, and tissue fold pixels may be the rarest). Multiple classes also have the capability to be set to the same priority, but various embodiments may or may not use this capability. The thumbnails may be cropped so that the highest priority class the thumbnail contains is placed as close to the center of the crop as possible. If the thumbnail contains more than one pixel of its highest priority class, the crop may randomly place a pixel of that class into the center of the crop. For example, a slide containing background, tissue, and air bubbles may be cropped with an air bubble pixel in the center of the crop, because background and tissue pixels may be more numerous than air bubbles pixels in the entire dataset. If no priority class is found on the thumbnail, a random crop may be chosen, without consideration of class identity. According to some embodiments, the class priority ranking may be set to:

(1) tissue fold
(2) out of focus
(3) pen marks
(4) air bubbles

The training infrastructure for the UNet may utilize scalable hyperparameter optimization. The training process may be completely configurable through JSON files, for example, allowing customization of which hyperparameters are optimized for different model deployments and customer sites. Some embodiments may only optimize on the learning rate. Some embodiments may be trained with a batch size of 16 images, for up to 200 epochs per trial.

According to some embodiments, the region of interest deep learning artifact detector 208 may provide a severity score for any detected artifact. The severity score may indicate an amount of coverage of the detected artifact, which may be determined as a number of pixels classified in the artifact class divided by the sum of the number of pixels classified in an artifact class and the number of pixels classified in the tissue class. By way of non-limiting example, the severity score may be specified as:

$$\text{severity}_{score} = \frac{\text{number of pixels of artifact on tissue}}{\text{total numnber of tissue pixels in the slide(artifacts included)}}$$

Thus, by way of non-limiting example, the severity score may range from 0 (no tissue is affected by an artifact) to 1 (the entire tissue area is affected by an artifact).

FIG. 4 depicts an annotation 400 of an image, indicating pixels classified as background 412, tissue 404, pen markings 406, and an air bubble 408. The annotation 400 may represent a whole slide image, a macro image, or a thumbnail image. Different shades in the annotation 400 indicate different pixel classes. The annotation 400 may be associated with a corresponding image that is used to train a deep learning classifier, such as the region of interest deep learning artifact detector 208, the deep learning tissue detector for thumbnail images 202, or the deep learning tissue detector for macro images 204. Alternately, or in addition, the annotation may be provided as an output from any of the deep learning artifact detector 208, the deep learning tissue detector for thumbnail images 202, or the deep learning tissue detector for macro images 204. If output from the deep learning tissue detector for thumbnail images 202 or the deep learning tissue detector for macro images 204, the annotation 400 may omit the classifications for pen markings 406 and air bubble 408, or reclassify them as background 412.

Returning to FIG. 2, the computer vision tissue detector 206 may be implemented as a computer vision pipeline with the following steps, by way of non-limiting example:

(1) The RGB thumbnail or macro image is converted to greyscale, and wherever this gray scale image is dark (e.g., having value below a threshold), the original image is made to be white.

(2) The thumbnail or macro image is then color balanced.

(3) The thumbnail or macro image contrast is then enhanced.

(4) The thumbnail or macro image is converted to HSV colorspace (hue, saturation, value; as opposed to RGB, red, blue, green).

(5) The saturation channel of the HSV thumbnail or macro image is blurred using a median kernel.

(6) OTSU thresholding is applied to the blurred image.

(7) Tissue contours are detected on this image, and are filtered for size and shape.

(8) The detected contours that pass filtering are over tissue regions on the thumbnail or macro image, and correspond to tissue regions on the high resolution whole slide image.

The output of the computer vision tissue detector 206 is an image mask. In general, an image mask (or "mask") is a Boolean image where every pixel is either white/one or black/zero to indicate a presence and absence of a particular feature, in this instance, tissue. Sometimes a mask is the same resolution as the thumbnail or macro, but not always. The computer vision tissue detector 206 mask may be the same resolution as the input thumbnail or macro, and may contain a 1 (or 0) wherever tissue is found on the thumbnail and a 0 (or 1) wherever tissue is absent. The parameters in the computer vision tissue detector 206 may be hand-tuned.

The deep learning tissue detector for thumbnails 202 and the deep learning tissue detector for macros 204 may be implemented as follows. In general, the deep learning tissue detector for thumbnails 202 and the deep learning tissue detector for macros 204 may be implemented in a similar manner, except that the deep learning tissue detector for thumbnails 202 may be trained using annotated thumbnail images, and the deep learning tissue detector for macros 204 may be trained using annotated macro images. According to some embodiments, the deep learning tissue detector for thumbnails 202 may include multiple deep learning tissue detectors for generating tissue masks for thumbnails of various sizes.

Each of the deep learning tissue detectors 202, 204 may output a mask depicting regions of tissue and non-tissue. The indications may be pixelwise, and may contain a 1 (or 0) wherever tissue is found and a 0 (or 1) wherever tissue is absent. The output of the deep learning tissue detector for thumbnails 202 may be a thumbnail sized mask, by way of non-limiting example, and the output of the deep learning tissue detector for macros 204 may be a macro sized mask, by way of non-limiting example.

Each deep learning tissue detector 202, 204 may be implemented using a UNet class. The UNet may be the same as, or different from, the UNet shown and described herein in reference to FIG. 3. According to some embodiments, the same electronic neural network may be used to identify artifacts such as pen markings, air bubbles, and out of focus portions, and to generate a tissue mask. The tissue mask may be generated by designating the tissue class pixels as one value, e.g., 1, and pixels of all other classes as another value, e.g., 0. According to other embodiments, separate electronic neural networks may be implemented to detect artifacts (e.g., pen markings, air bubbles, and out of focus portions) and to generate tissue masks.

For training the deep learning tissue detectors 202, 204, training images along with associated masks may be provided, e.g., thousands, tens of thousands, hundreds of thousands, or millions. The associated masks may be generated by hand, and/or may be generated automatically, e.g., using a computer vision tissue detection technique, such as by using the computer vision tissue detector 206 as shown and described herein.

A description of how the tissue detectors 202, 204, 206 are used to detect misplaced, partially missing, and absent tissue artifacts follows. In general, any of the deep learning tissue detectors for thumbnails 202, the deep learning tissue detector for macros 204, and/or the computer vision tissue detector 206 may be used to detect misplaced, partially missing, and absent tissue in corresponding high resolution whole slide images. Each of these tissue detectors 202, 204, 206 produces a tissue mask corresponding to an input thumbnail or macro image of a whole slide image.

To detect an absent tissue artifact, that is, no or insufficient tissue on a high resolution whole slide image, the corresponding macro or thumbnail image may be input to a respective tissue detector 202, 204, 206 to generate a tissue mask. For example, the macro image may be input to the deep learning tissue detector for macros 204 or the computer vision tissue detector 206, and the thumbnail image may be input to the deep learning tissue detector for thumbnails 202 or the computer vision tissue detector 206. To determine whether the whole slide image contains no or insufficient tissue, the number of pixels representing tissue (e.g., with a value of 1) in the resulting mask is counted. Either the raw tissue pixel count may be used, or a ratio (e.g., percentage) of pixels representing tissue to total pixels in the image may be used. The value is compared to a predetermined threshold, and the corresponding whole slide image is determined to have an absent tissue artifact if the comparison results in a determination that the value is less than the predetermined threshold. Non-limiting example percentage thresholds may be 5%, 2%, or 1%.

According to some embodiments, an absent tissue artifact may be detected using the following techniques. The respective macro or thumbnail image is subjected to filtering pixel colors in HSV color space (hue, saturation, value; HSV as opposed to RGB). Some embodiments may threshold the hue, saturation, and value so that only pixels within the allowed range are passed from the function. These thresholds may be hand-tuned to remove artifact pixels and background pixels. The resulting image may be used to detect tissue directly, e.g., used as a mask, or passed to any of the tissue detectors 202, 204, 206 as described above to detect an absent tissue artifact.

To detect a partially missing tissue artifact in a high resolution whole slide image, any, or any combination, of several techniques may be used as described presently. As noted elsewhere herein, partially missing tissue artifacts may include artifacts due to the high resolution scanning process not scanning a portion of tissue present on the pathology slide, which may result in sharp edges of tissue in the whole slide image, referred to as a cutoff tissue artifact, or may be due to the high resolution scanning process not scanning an entire portion of tissue in the pathology slide, for example, when more than one tissue portion is present on the slide, referred to as a partially excluded tissue artifact. Different techniques may be used to detect these different forms of partially missing tissue artifact.

A first technique for detecting partially missing tissue artifacts detects partially excluded tissue artifacts. According to this first technique, a whole slide image may be determined to have a partially excluded tissue artifact based on comparing a tissue mask for the corresponding macro image with a tissue mask for a corresponding thumbnail image. Either the deep learning tissue detector for thumbnails 202 or the computer vision tissue detector 206 may be used to generate a tissue mask for the thumbnail image. Either the deep learning tissue detector for macros 204 or the computer vision tissue detector 206 may be used to generate a tissue mask for the macro image. In general, a whole slide image may be determined to have a partially excluded tissue artifact if a comparison of the tissue mask for the thumbnail image to the tissue mask for the macro image determines that the tissue mask for the thumbnail image includes more tissue sections, or more tissue contours, than the tissue mask for the macro image. According to this technique, one or both masks may be cleaned up with computer vision techniques for removing noise in the form of tiny insignificant tissue sections called floaters, and/or techniques for closing gaps between tissues that are very close together to simplify the counting comparison. The comparison may include counting the number of tissue sections, or tissue contours, on each mask (macro and thumbnail). If more tissue sections, or tissue contours, are counted in the tissue mask for the macro image than in the tissue mask for the thumbnail image, the corresponding whole slide image may be determined to have a partially missing tissue artifact, specifically, a partially excluded tissue artifact.

A second technique for detecting partially missing tissue artifacts detects cutoff tissue artifacts. According to various embodiments, the second technique detects cutoff tissue artifacts by comparing a tissue mask produced by any of the deep learning tissue detector for thumbnail images 202, the deep learning tissue detector for macro images 204, or the computer vision tissue detector 206 to one or more templates. In particular, the second technique searches for horizontal or vertical lines in the tissue mask by template matching. A thresholded number of pixels in a row that belongs to a horizontal or vertical edge in the tissue mask may indicate the presence of a cutoff tissue artifact.

According to various embodiments for the second technique, the template matching uses one (or more) reference image(s) referred to as a template and virtually slides it across the entire tissue mask one pixel at a time to determine the most similar objects in a process referred to as scanning a template. Templates are typically images that are much smaller than the tissue mask. Scanning a template may produce another image or matrix where pixel values correspond to how similar the template is to the tissue mask. Thus, when the image output from the scanning the template process is viewed or analyzed, the pixel values of the matched objects may be peaking or highlighted.

Some embodiments use horizontal and/or vertical edge templates. An edge can be defined as points in a digital image at which the image brightness changes sharply or has discontinuities. Some embodiments use four binary edge templates, two horizontal and two vertical edge templates. These sharp edge templates may be scanned over the tissue mask. A match heatmap, whether output in any form (e.g., displayed) or not, may measure how well the template matches the tissue mask. The template matches the tissue mask where the tissue is cut off, because a horizontal or vertical edge in the tissue detection mask indicates that the tissue is cut off at the edge. This heatmap may be thresholded (e.g., at or near 0) to obtain a template matching mask, indicating where the tissue detection mask matches a template. In this heatmap, where one of the templates is a match, a pixel may be labeled with a one in the output template matching mask (all or most other pixels may be zero). This output template matching mask may then be summed, to measure the total number of times the tissue mask matches the edge templates. If comparing the sum to a predetermined threshold indicates that the sum exceeds the threshold, then the thumbnail image, and the whole slide image corresponding to the thumbnail image, may be determined to contain a cut off tissue artifact. This threshold may be determined empirically based on the length of a handful of edges, e.g., measured by hand.

A third technique for detecting partially missing tissue artifacts detects misplaced tissue artifacts in a whole slide image. The third technique may utilize a tissue mask for the whole slide image and produced by any of the deep learning tissue detector for thumbnails or the computer vision tissue detector 206. A whole slide image may determined to have a misplaced tissue artifact if comparing the corresponding tissue mask to a frame at the edge of the slide indicates that tissue is within a specified margin at the edge of the slide. The frame may be defined as all pixels within a predetermined number of pixels (e.g., 1, 2, 5, 10) from the edge of the slide. This technique detects cut off tissue at the edge of the of the whole slide image. The part of the tissue that lies within the frame may be specified as the misplaced tissue.

A description of a non-limiting example slide level deep learning artifact detector 210 and a non-limiting example deep learning stain classifier 212 follows.

FIG. 5 depicts a ResNet architecture for a slide level deep learning model for detecting the presence of an artifact, such as a periodic scanning error or a misplaced coverslip, on a high resolution whole slide image by detecting the presence of such an artifact on a thumbnail derived from the high resolution whole slide image. In general, detection of slide level artifacts such as periodic scanning errors and coverslip detection, and/or stain classification, may be performed by a ResNet deep learning model. In particular, the slide level deep learning artifact detector 210 and/or the deep learning stain classifier 212 as shown and described herein in reference to FIG. 2 may include an electronic neural network that uses such a ResNet architecture 500. Residual Networks, or ResNets, may bypass the data from one layer to another using shortcut connections or skip connections, a non-limiting example of which is shown and described presently in reference to FIG. 6.

Figure 6:
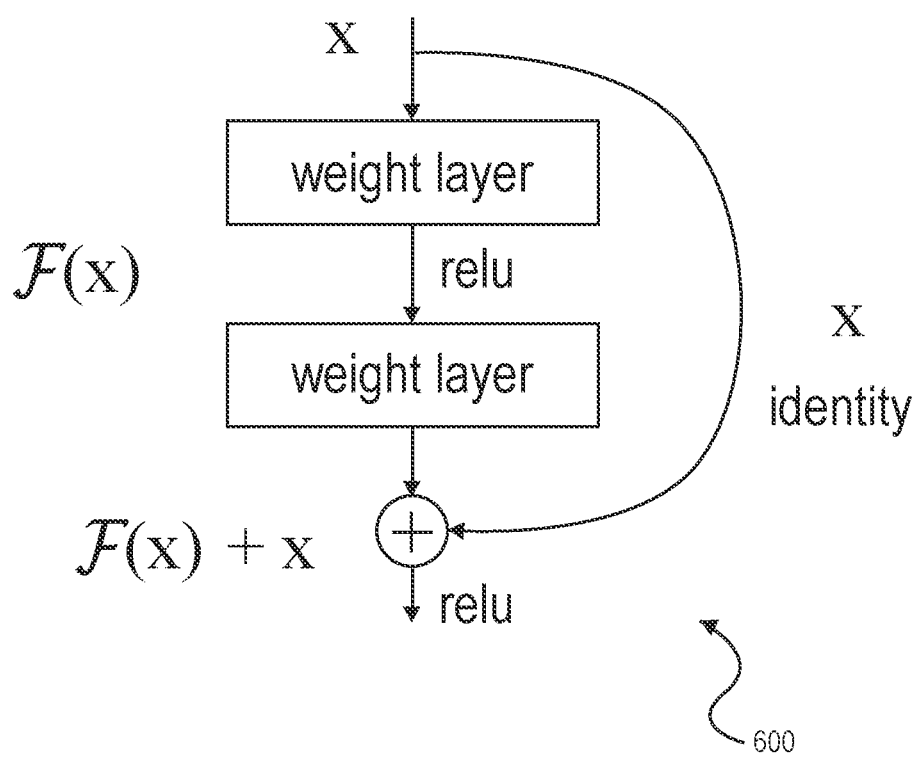
FIG. 6 depicts a skip connection for a ResNet architecture for a slide level deep learning model for detecting the presence of an artifact on a high resolution whole slide image by detecting the presence of such an artifact on a thumbnail derived from the high resolution whole slide image.

FIG. 6 depicts a skip connection 600 for a ResNet architecture for a slide level deep learning model for detecting the presence of an artifact on a high resolution whole slide image by detecting the presence of such an artifact on a thumbnail derived from the high resolution whole slide image. The usage of skip connections allows the data to flow easily between the layers of a ResNet without hampering the learning ability of the deep learning model. The advantage of adding this type of skip connection is that if any layer hurts the performance of the model, it will be skipped.

Returning to FIG. 5, the architecture of the ResNet 500 shown in FIG. 5 may be, by way of non-limiting example, that of a ResNet18. ResNet18 may be implemented to include 72-layer architecture with 18 residual blocks. The ResNet architecture 500 may be used to implement the slide level deep learning artifact detector 210 to detect, by way of non-limiting examples, the presence of elements in the three following classes: periodic scanning errors, folded tissue, and a specified stain. Thus, the ResNet architecture 500 may be used to implement the slide level deep learning artifact detector 210 and the deep learning stain classifier 212. The ResNet architecture 500 may utilize one sigmoid head per class, continuing the non-limiting example, three individual sigmoid heads. Each head may be trained to detect the presence of an artifact (and/or specific stain) in a one-vs-rest manner. The use of multiple heads allows multiple artifacts (and/or stain) to be detected at once if they are present in the slide.

Each sigmoid head of the Resnet18 may have its own objective function, such as a Cross Entropy Loss function, which may be defined as, by way of non-limiting example:

$$\text{loss}(x, \text{class}) = -\sum_j [\text{class}]_j \log(x[j])$$

In the above equation, [class] is the binary presence/absence of one of the classes, e.g., the three example classes described above. As the Resnet18 classifies at a slide level, the loss may be calculated at a slide level for each sigmoid head individually. The losses for the three sigmoid heads may be summed to an overall objective function. According to various embodiments, weighting each head differently may be supported, but the default behavior may be to weigh each sigmoid head equally.

According to some embodiments, stain classification such as non-H&E stain detection may occur in a separate model that is triggered before the artifact detection models. This allows the rest of the quality control models to either run (and deliver output) or not run depending on the type of stain detected. For example, according to some embodiments, if an H&E stain is not detected, then the process may output an indication thereof, e.g., without providing an output regarding the presence or absence of any artifacts.

The training infrastructure for the ResNet architecture 500 may utilize scalable hyperparameter optimization. The training process may be completely configurable through JSON files, for example, allowing customization of which hyperparameters are optimized for different model deployments and customer sites. Some embodiments may only optimize on the learning rate. Some embodiments may be trained with a batch size of 16 images, for up to 200 epochs per trial.

In general, the slide level deep learning artifact detector 210, which may include the ResNet architecture 500, may be trained using a plurality, e.g., thousands, tens of thousands, hundreds of thousands, or millions, of annotated training images. Each training image may be the same size as a thumbnail image. Each training image may depict a tissue sample and a background, as well as one or more artifacts, e.g., one or more periodic scanning errors, and/or folded tissue portions. In addition, or in the alternative, each training image may depict a stain of the tissue sample, e.g., H&E, a special stain, IHC, a different stain, or no stain whatsoever. Each training image may be annotated by associating a label, e.g., a class number, with the training image.

The output of the slide level deep learning artifact detector 210 may include one or more slide-level labels. Such labels may be numeric quantities that indicate the presence at the slide level of one or more of: a periodic scanning error, folded tissue, H&E staining, special staining, IHC staining, no stain, or a different stain. For example, the output may provide a true/false indication for each of: periodic scanning error, folded tissue, H&E staining, special staining, IHC staining, no stain, and a different specified stain.

Figure 7:
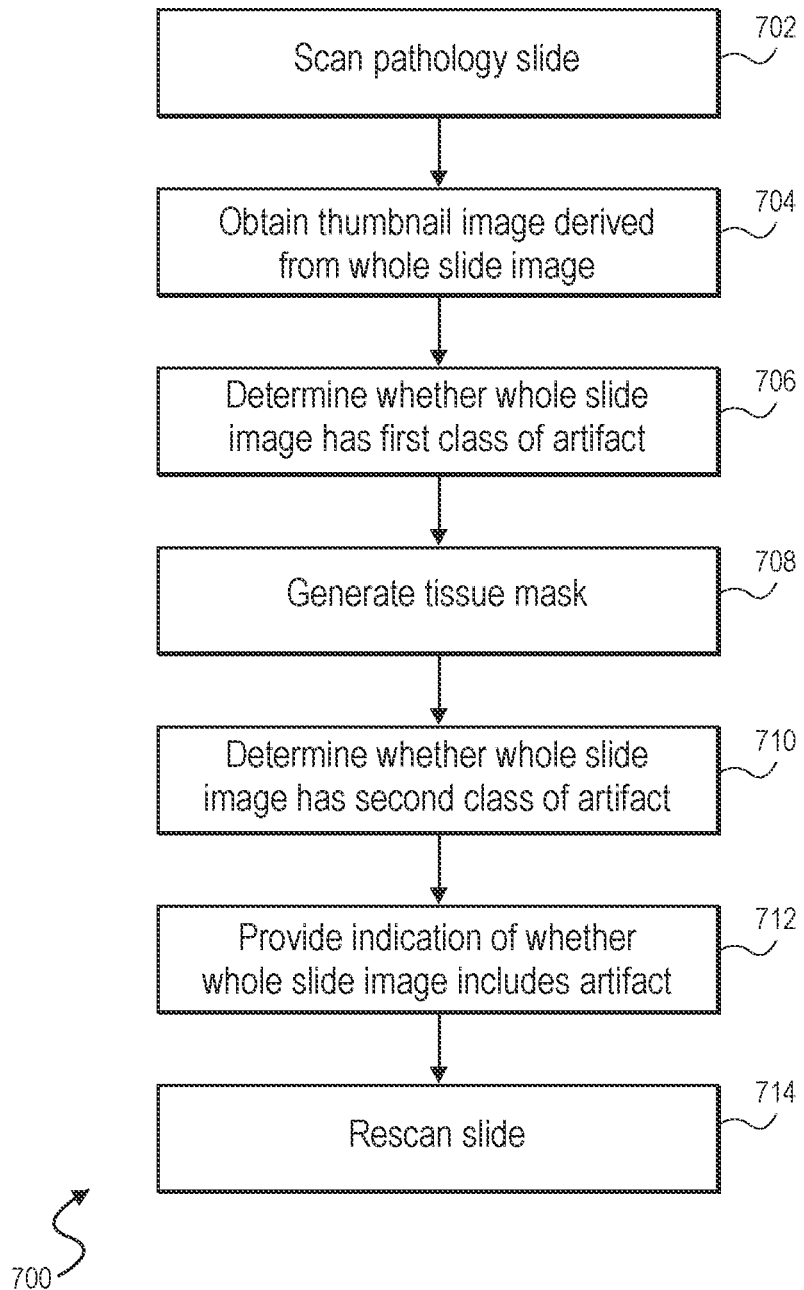
FIG. 7 is a flow diagram of a method of automated quality control for digital pathology whole slide images according to various embodiments.

FIG. 7 is a flow diagram of a method 700 of automated quality control for digital pathology whole slide images according to various embodiments. The method 700 may be implemented using the system 100 shown and described herein in reference to FIG. 1. For example, the method 700 may be implemented using a slide scanner, such as the slide scanner 102, and a controlling computer, such as the controlling computer 120, whether the controlling computer is integrated with the slide scanner or communicatively coupled to the slide scanner. The method 700 may are integrated with an image management system and triggered automatically, e.g., when a pathology slide is scanned.

At 702, a pathology slide, such as the pathology slide 114, is scanned, e.g., by a slide scanner such as the slide scanner 102. The scanning may capture one or both of a high resolution whole slide image and a low resolution macro image.

At 704, a low resolution thumbnail image is obtained, e.g., by deriving the thumbnail image from a whole slide image of the pathology slide scanned at 702. In general, the thumbnail image may be obtained as described herein in reference to FIG. 1.

At 706, a determination is made as to whether the slide or the whole slide image includes a first class of artifact. By way of non-limiting examples, the artifact may be a slide quality artifact, such as a pen marking, air bubble, tissue fold, or misplaced coverslip, or may be an image quality artifact, such as an out of focus portion or periodic scanning error. The determination may be made by providing the thumbnail image derived from the whole slide image to an electronic neural network, such as the region of interest deep learning artifact detector 208 as shown and described herein in reference to FIGS. 2, 3, and 4 and/or the slide level deep learning artifact detector 310 as shown and described herein in reference to FIGS. 2, 5, and 6. In general, the electronic neural network may be trained to detect artifacts in the first class of artifacts by analyzing a plurality of labeled training thumbnail images.

According to some embodiments, the actions of 706 may further include determining a stain classification, such as whether or not the slide is stained with H&E, whether or not the slide is stained with a special stain, whether or not the slide is stained with IHC, whether or not the slide is stained with a different specified stain, or whether or not the slide lacks any stain whatsoever.

At 708, a tissue mask is generated representing tissue in the thumbnail image. The tissue mask may be generated using a tissue detector such as any of the deep learning tissue detector for thumbnails 202 or the computer vision tissue detector 206 as shown and described in reference to FIG. 2.

At 710, a determination is made as to whether the whole slide image includes a second class of artifact. By way of non-limiting examples, the artifact may be a slide quality artifact such as a misplaced tissue artifact or certain types of absent tissue artifacts, or may be an image quality artifact, such as a partially missing tissue artifact or certain types of absent tissue artifacts. The determination may be made performing a comparison using the thumbnail image tissue mask, e.g., as shown and described herein in reference to FIG. 2. For example, the determination of an absent tissue artifact may include comparing a tissue pixel count or tissue pixel ratio for the thumbnail image tissue mask to a predetermined threshold as disclosed in detail herein. As another example, the determination of a partially missing tissue artifact, e.g., a partially excluded tissue artifact, may include comparing a number of tissue sections or tissue contours in the thumbnail image tissue mask for the slide to a number of tissue sections or tissue contours in a macro image tissue mask for the whole slide image, as disclosed herein in detail. As yet another example, the determination of a partially missing tissue artifact, e.g., a cutoff tissue artifact, may include comparing the thumbnail image tissue mask to one or more templates as disclosed herein in detail. As yet another example, the determination of a partially missing tissue artifact, e.g., a misplaced tissue artifact, may include comparing the thumbnail image tissue mask to a frame as disclosed herein in detail.

At 712, an indication is provided as to whether the whole slide image includes an artifact, which may be a first class or artifact or a second class of artifact, and which may be a slide quality artifact or an image quality artifact. The indication may be provided in any of a variety of ways. For example, according to some embodiments, a textual or iconic indication may be displayed on a computer screen such as that of the controlling computer 120 as shown and described in reference to FIG. 1. Such a textual or iconic indicator may be an indication of the type of artifact, e.g., "pen marking," "air bubble," "out of focus," "tissue fold," "misplaced coverslip," "tissue absent," "tissue partially missing," "tissue partially excluded," "tissue cutoff," "tissue misplaced," etc. In addition, or in the alternative, the indication may specify whether a detected artifact is a slide quality artifact (e.g., air bubble, pen ink, misplaced tissue, folded tissue, misplaced coverslip, etc.) or a scanning quality artifact (e.g., out of focus, tissue partially missing, tissue partially excluded, periodic scanning error, etc.). In addition, or in the alternative, some embodiments may specifically identify a region or regions of the whole slide image in which artifact appears. According to such embodiments, such indications may be displayed to the user as annotations, image overlays, or point-indicators (e.g., an arrow). If displayed as image overlays, the overlays may have adjustable transparency, e.g., from completely opaque to completely transparent, such that the original whole slide image may be seen in tandem, or such that other overlays may be seen in tandem. The overlays may also be exported as a set of coordinates or contours for use in another application, e.g., in order to select regions for inclusion or exclusion when performing a downstream task such as quantitative image analysis, e.g., machine learning diagnosis. According to some embodiments, any indication of a region of interest may be provided by, or accompanied by, a severity score.

According to some embodiments, the actions of 712 may further include providing a stain classification indication. The stain classification indication may indicate whether or not the slide is stained using H&E, whether or not the slide is stained with any other specified stain, such as a special stain or IHC, or whether or not the slide lacks any stain whatsoever. The indication may specify a stain classification, e.g., by way of displaying a textual or iconic indication on a computer screen such as that of the controlling computer 120 as shown and described in reference to FIG. 1. The textual or iconic indication may be an indication of the stain classification, such as "H&E," "No H&E," "Special Stain," "IHC Stain," "Other Stain," "No Stain," etc.

According to some embodiments, a user may interact with a quality artifact indication, e.g., by confirming or rejecting a slide-level or regional-level indication, or by editing or adjusting a regional indication to cover a different region, which may overlap the automatically detected region.

At 714, the slide is automatically rescanned if a scanning artifact, by way of non-limiting example, out of focus, tissue folded, tissue partially missing, tissue partially excluded, tissue cutoff, tissue missing sections, and/or absent tissue, is present in the whole slide image. According to some embodiments, actions 702, 704, 706, 708, 710, 712, and 714 may occur without the slide leaving the slide scanner. The image(s) produced by the rescan may replace the images produced by the scan of 702.

The actions of 714 are non-limiting examples of actions that can occur after the prior actions. Other actions, examples of which are set forth below, may be taken in addition or in the alternative.

According to some embodiments, whole slide images, or regions of images, with quality artifacts detected may be automatically set aside for review by an appropriate technician, researcher, or pathologist, for example. If a region identified as containing an artifact is determined to be insufficient for use, that region may be excluded from use (for example, in the development or testing of a machine learning application, such as a machine learning diagnostic application).

Once the quality artifact indications have been generated, results may be automatically stored in local or remote electronic persistent memory. Such results may include any, or any combination, of the whole slide image, the indication(s) of artifact(s), the macro image, and/or the thumbnail image. The results may be stored in a database, such as in an image management system. The indications may be searchable, such that a user (e.g., a technician or pathologist) may search for sets of images that contain or do not contain a specific artifact, or contain or do not contain any artifact, or do or do not contain a specific combination of artifacts. Similarly, such a user may be able to sort any of whole slide images, macro images, and/or thumbnail images based on their indicated artifacts, e.g., in terms of artifact type and/or quantity. According to some embodiments, the results are accessible to the user both as they are reviewing individual images and in summary format. In some cases, quality artifact indications may be aggregated, e.g., with another indication conveying to the user whether any quality artifacts were found for the slide at all or whether the slide was completely free of quality issues. According to some embodiments, a summary of results for several or many slides or several or many groups of slides may be delivered to the user in the form of a notification, a dashboard, or a report.

Some automated action may be taken within the image management system or another connected system depending on the quality artifact indications, e.g., moving corresponding images or data to a different location, folder, or repository so that the user can easily perform some action based on the quality artifact indications. Such an action may be, e.g., approving images for review by a pathologist, reviewing images or outputs manually, or determining that cases are inappropriate for review or for a particular study.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by a processor.

These computer readable program instructions may be provided to a processor of a general-purpose computer, special purpose computer, or other programmable data processing apparatus to produce a machine, such that the instructions, which execute via the processor of the computer or other programmable data processing apparatus, create a machine for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of automated quality control for digital pathology whole slide images, the method comprising:
   obtaining, automatically and using a computer, a thumbnail image derived from a whole slide image of a pathology slide by downsampling the whole slide image of the pathology slide, wherein the thumbnail image has a lower resolution than a resolution of the whole slide image;
   determining, automatically and using the computer, whether the whole slide image includes an artifact in a first class of artifacts, wherein the determining whether the whole slide image includes an artifact in the first class of artifacts comprises providing the thumbnail image to an electronic neural network, wherein the electronic neural network is trained to detect artifacts in the first class of artifacts by analyzing a plurality of labeled training thumbnail images;
   generating, automatically and using the computer, a tissue mask representing tissue depicted in the thumbnail image, wherein the generating comprises one of applying a computer vision process, wherein the computer vision process implements thresholding, or an electronic neural network trained using a plurality of training thumbnail images with labeled pixels, wherein a first label value indicates a tissue pixel and at least one second label value indicates a non tissue pixel;
   determining, automatically and using the computer, whether the whole slide image includes an artifact in a second class of artifacts, wherein the second class of artifacts comprises:
   absent tissue, partially missing tissue, and misplaced tissue, and wherein the determining whether the whole slide image includes an artifact in the second class of artifacts comprises automatically performing a comparison using the tissue mask;
   forming, automatically and using the computer, an indication of whether the whole slide image includes an artifact in the first class of artifacts or an artifact in the second class of artifacts, wherein the indication comprises a combination assessment of whether the whole slide image contains at least one slide quality artifact and at least one image quality artifact; and
   providing, automatically and using the computer, the indication.

2. The method of claim 1, further comprising scanning the pathology slide using a high-resolution camera of a whole slide image scanner.

3. The method of claim 2, further comprising automatically re-scanning the pathology slide to obtain a replacement whole slide image upon a determination that the whole slide image includes an artifact in the first class of artifacts or an artifact in the second class of artifacts.

4. The method of claim 1, wherein the first class of artifacts comprises: pen mark, air bubble, out-of-focus, and tissue fold.

5. The method of claim 1, wherein the first class of artifacts comprises: misplaced coverslip and periodic scanning error.

6. The method of claim 1, wherein the comparison comprises comparing the tissue mask to an edge template to detect partially missing tissue.

7. The method of claim 1, wherein the comparison comprises comparing the tissue mask to a second tissue mask generated from a macro image of the pathology slide to detect partially missing tissue, wherein the macro image is obtained using a camera with a lower resolution than a resolution of a camera used to obtain the whole slide image.

8. The method of claim 1, wherein the comparison comprises comparing a count of pixels representing tissue in the tissue mask to a predetermined threshold to detect absent tissue.

9. The method of claim 1, wherein the generating the tissue mask is performed using an electronic neural network trained using a plurality of labeled training thumbnail images.

10. The method of claim 1, further comprising determining whether the whole slide image includes H&E staining.

11. The method of claim 10, wherein the determining whether the whole slide image includes H&E staining comprises providing the thumbnail image to the electronic neural network.

12. The method of claim 1, further comprising storing the thumbnail image in a database in association with a label indicating whether the whole slide image includes an artifact in the first class of artifacts or an artifact in the second class of artifacts, wherein the database is searchable according to artifact type.

13. A system for automated quality control for digital pathology whole slide images, the system comprising an electronic processor and non-transitory persistent storage containing instructions that, when executed by the electronic processor, configure the electronic processor to perform actions comprising:
   obtaining a thumbnail image derived from a whole slide image of a pathology slide by downsampling the whole slide image of the pathology slide, wherein the thumbnail image has a lower resolution than a resolution of the whole slide image;
   determining whether the whole slide image includes an artifact in a first class of artifacts, wherein the determining whether the whole slide image includes an artifact in the first class of artifacts comprises providing the thumbnail image to an electronic neural network, wherein the electronic neural network is trained to detect artifacts in the first class of artifacts by analyzing a plurality of labeled training thumbnail images;

generating a tissue mask representing tissue depicted in the thumbnail image, wherein the generating comprises one of applying a computer vision process, wherein the computer vision process implements thresholding, or an electronic neural network trained using a plurality of training thumbnail images with labeled pixels, wherein a first label value indicates a tissue pixel and at least one second label value indicates a non tissue pixel;

determining whether the whole slide image includes an artifact in a second class of artifacts, wherein the second class of artifacts comprises: absent tissue, partially missing tissue, and misplaced tissue, and wherein the determining whether the whole slide image includes an artifact in the second class of artifacts comprises performing a comparison using the tissue mask;

forming, automatically and using the computer, an indication of whether the whole slide image includes an artifact in the first class of artifacts or an artifact in the second class of artifacts, wherein the indication comprises a combination assessment of whether the whole slide image contains at least one slide quality artifact and at least one image quality artifact; and providing the indication.

14. The system of claim 13, wherein the actions further comprise scanning the pathology slide using a high-resolution camera of a whole slide image scanner.

15. The system of claim 14, wherein the actions further comprise automatically re-scanning the pathology slide to obtain a replacement whole slide image upon a determination that the whole slide image includes an artifact in the first class of artifacts or an artifact in the second class of artifacts.

16. The system of claim 13, wherein the first class of artifacts comprises: pen mark, air bubble, out-of-focus, and tissue fold.

17. The system of claim 13, wherein the first class of artifacts comprises: misplaced coverslip and periodic scanning error.

18. The system of claim 13, wherein the comparison comprises comparing the tissue mask to an edge template to detect partially missing tissue.

19. The system of claim 13, wherein the comparison comprises comparing the tissue mask to a second tissue mask generated from a macro image of the pathology slide to detect partially missing tissue, wherein the macro image is obtained using a camera with a lower resolution than a resolution of a camera used to obtain the whole slide image.

20. The system of claim 13, wherein the comparison comprises comparing a count of pixels representing tissue in the tissue mask to a predetermined threshold to detect absent tissue.

21. The system of claim 13, wherein the generating the tissue mask is performed using an electronic neural network trained using a plurality of labeled training thumbnail images.

22. The system of claim 13, wherein the actions further comprise determining whether the whole slide image includes H&E staining.

23. The system of claim 22, wherein the determining whether the whole slide image includes H&E staining comprises providing the thumbnail image to the electronic neural network.

24. The system of claim 13, wherein the actions further include storing the thumbnail image in a database in association with a label indicating whether the whole slide image includes an artifact in the first class of artifacts or an artifact in the second class of artifacts, wherein the database is searchable according to artifact type.

* * * * *